UNITED STATES PATENT OFFICE.

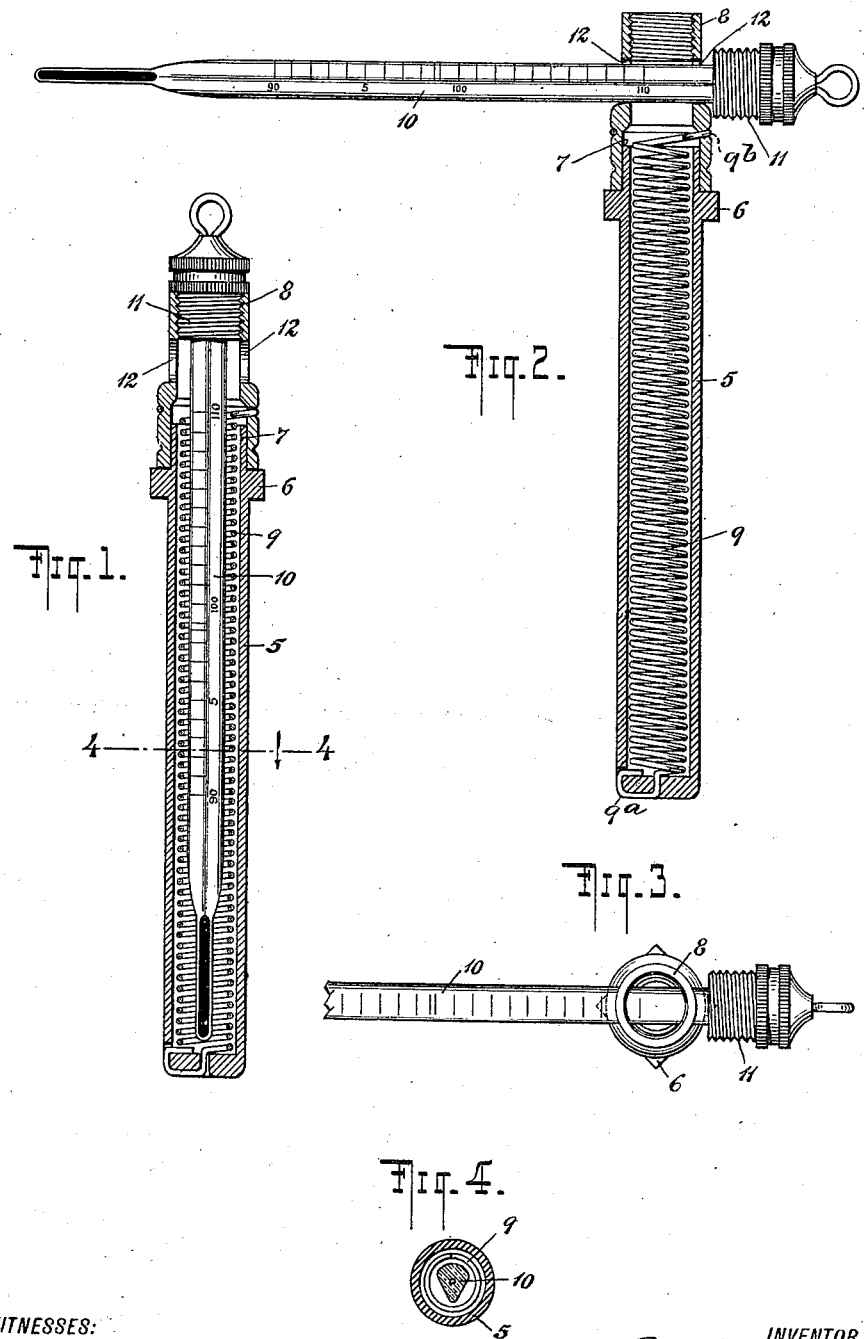

RALPH F. SCHNEIDER, OF NEW YORK, N. Y., ASSIGNOR TO CHARLES J. TAGLIABUE, OF BROOKLYN, NEW YORK.

CLINICAL-THERMOMETER CASING.

987,749.   Specification of Letters Patent.   Patented Mar. 28, 1911.

Application filed January 6, 1911. Serial No. 601,109.

*To all whom it may concern:*

Be it known that I, RALPH F. SCHNEIDER, a citizen of the United States, and a resident of the borough of Brooklyn, county of Kings, city and State of New York, have invented certain new and useful Improvements in Clinical-Thermometer Casings, of which the following is a specification.

My invention relates to casings for clinical thermometers and has for its object to construct such casings so that the same in addition to serving as a protecting, or carrying medium for said thermometers, may also be used as a means for returning the mercury to normal position through the utilization of centrifugal force, after a reading has been taken.

The particular object of my invention is to do away with the necessity for shaking down the mercury by a series of sharp jerks, an operation which often results in breaking the thermometer and which, at best, can only be successfully accomplished after much experience and many trials.

My invention will be fully described hereinafter, and the features of novelty will be pointed out in the appended claims.

Reference is to be had to the accompanying drawings in which—

Figure 1 is a central longitudinal section of my improved casing with the thermometer in position therein; Fig. 2 is a similar view showing the thermometer in position to have the mercury returned to normal; Fig. 3 is a plan view of Fig. 2 and Fig. 4 is a horizontal section on the line 4—4 of Fig. 1.

In the drawings, the casing comprises a tubular body or main portion 5 having its one end closed in the usual manner and a preferably integral flange 6 located near its opposite open end. The outer diameter of the body portion 5 from the flange 6 to the said open end is slightly reduced to form a bearing neck 7 on which an open ended sleeve 8 is rotatably mounted although this reduction in diameter is not absolutely necessary. A coil spring 9 extends lengthwise of the interior of the casing and has its one end $9^a$ secured to the body portion 5 near the closed end thereof and its opposite end $9^b$ secured to the sleeve 8. The said spring 9 exerts a tension on the sleeve 8 and maintains it against the flange 6 and on the neck 7, while still permitting the said sleeve 8 to be rotated as will be more fully described hereinafter. The coil spring is preferably of an outer diameter to easily fit the inner diameter of the casing and at all events is of a sufficiently large inner diameter to permit the tube of the thermometer 10 to be readily inserted therein. The one end of the thermometer tube in the specific form illustrated is fitted in an externally screw threaded cap 11 which is arranged to screw into the internally screw threaded end of the sleeve 8. When the thermometer and sleeve are thus coupled together, the tension of the spring 9 serves to maintain said thermometer in position in the casing which in this condition of the parts serves as a protecting and carrying medium in the usual way. The sleeve 8 is also provided in its vertical portion with diametrically opposite openings 12 of a diameter sufficiently large to permit the tube of the thermometer 10 to be inserted therein and preferably of a size to frictionally hold said thermometer tube.

After the thermometer has been used to take a temperature and a reading has been had and it is desired to return the mercury to normal position the tube of the thermometer is inserted into the openings 12 so as to extend across the axis of the casing as clearly shown in Fig. 2, the cap 11 serving to limit the movement of said tube relatively to the sleeve in one direction. If the thermometer casing is now held in one hand and with the other hand the thermometer is moved in a circular path, the sleeve 8 will be rotated about its own axis on the bearing neck 7 so as to twist or torsionally wind the spring 9 and cause it to exert a torsional stress on the said sleeve 8. After the sleeve 8 has been thus rotated a few times and a sufficient amount of torsional stress secured, the thermometer tube is released from the influence of the hand of the physician or other person using the thermometer. As soon as the restraining influence of the hand is removed the torsional stress of the spring 9 will whirl the sleeve 8 about its axis in the opposite direction to that in which the winding was effected, and thus rapidly swing the thermometer in a circle. The centrifugal force generated through this rapid circular swinging of the tube will cause the mercury to fly toward the mercury bulb and thus back to normal position, the cap 11 preventing said centrifugal force from forcing the tube out of the openings 12. During this rotation of the sleeve 8 in either direction, the neck 7 and flange 6 form a bearing therefor and the axial tension of the spring 9 maintains said sleeve against removal from the said neck 7.

It will thus be seen that with my improved casing the mercury may easily and simply be returned to normal position without the necessity for shaking said thermometer, so that this operation may be accomplished by inexperienced persons and without danger of breaking the thermometer tube. The operation is also much quicker than the ordinary method of shaking the mercury back to normal position so that the thermometer may be made ready for successive use in a minimum of time. My improved casing, therefore, brings the ordinary clinical thermometer within the reach of a large number of inexperienced persons, as well as providing a simplified means for quickly returning the mercury to normal position for use by experienced persons, such as physicians, nurses and the like.

It is to be understood that while I have shown the thermometer secured in my improved casing through the medium of a screw threaded cap, this is only one way of accomplishing this and that other equivalent securing means may be used. The coil spring 9 also serves as an interior reinforcement for the casing or packing as it were and thus provides an additional protection for the thermometer tube.

Various changes in the specific construction shown and described may be made within the scope of the claims without departing from the spirit of my invention.

I claim:

1. A thermometer casing comprising two sections rotatable relatively to each other, one of which is provided with means for supporting a thermometer with its axis extending across the axis of the casing and means carried by said casing arranged to rotate the thermometer carrying section relatively to the other section.

2. A thermometer casing comprising two sections in axial alinement and rotatable relatively to each other, one of which is provided with means for supporting a thermometer with its axis extending across the axis of the casing and a spring connected with both sections arranged to be wound to exert a torsional stress on said sections and to rotate the thermometer carrying section relatively to the other section when released.

3. A thermometer casing comprising two sections in axial alinement one of which is provided with means for supporting a thermometer with its axis extending across the axis of the casing, a bearing neck on one section on which the other section is adapted to rotate, and a spring connected with both sections arranged to be wound to exert a torsional stress on said sections and to rotate the thermometer carrying section relatively to the other section when released.

4. A thermometer casing comprising a main portion, an axial alining sleeve rotatably mounted on said main portion and having diametrically opposite openings on opposite sides of its axis arranged to receive a thermometer tube, and a spring in said casing connected with said main portion and said sleeve arranged to be wound to exert a torsional stress on said sleeve and to rotate said sleeve relatively to the main portion when released.

5. The combination of a tubular body portion and an axially alining sleeve arranged to form therewith a casing into which the thermometer extends axially, a bearing on said body portion on which said sleeve is adapted to rotate, said sleeve being provided with diametrically opposite openings on opposite sides of its axis adapted to support a thermometer with its axis extending across the axis of the casing and a spring arranged to exert a tension on said sleeve in the direction of its axis and to be wound to exert a torsional stress on said sleeve and to rotate said sleeve when released.

In testimony whereof I have hereunto set my hand in the presence of two subscribing witnesses.

RALPH F. SCHNEIDER.

Witnesses:
 JOHN A. KEHLENBECK,
 M. H. LOCKWOOD.

---

Copies of this patent may be obtained for five cents each, by addressing the "Commissioner of Patents, Washington, D. C."